United States Patent Office 3,413,369
Patented Nov. 26, 1968

3,413,369
SATURATED HYDROCARBON ISOMERIZATION
PROCESS
Armand J. de Rosset, Clarendon Hills, Ill., assignor to Universal Oil Products Company, Des Plaines, Ill., a corporation of Delaware
No Drawing. Filed Aug. 30, 1966, Ser. No. 575,943
10 Claims. (Cl. 260—666)

ABSTRACT OF THE DISCLOSURE

Isomerization of saturated hydrocarbons in contact with a Group VIII metal, such as platinum, on a refractory inorganic oxide, such as alumina, which has been chemically combined with aluminum monofluoride vapor or silicon difluoride vapor at about 650–1200° C.

This invention relates to a conversion process for the isomerization of an isomerizable saturated hydrocarbon into more useful compounds. More specifically, this invention is concerned with a conversion process for the isomerization of an isomerizable saturated hydrocarbon utilizing a novel catalyst comprising a refractory inorganic oxide containing at least one metal from Group VIII of the Periodic Table chemically combined with a metal subfluoride vapor.

I have discovered a catalyst which can be effectively employed in isomerization reactions in which, for example, the carbon skeleton arrangement of the saturated hydrocarbon may undergo rearrangement.

It is therefore an object of this invention to provide a process for the isomerization of isomerizable saturated hydrocarbons utilizing a novel isomerization catalyst.

A specific object of this invention is to provide a novel method and a novel catalyst for isomerizing isomerizable saturated hydrocarbons to provide the desired isomerized product in high yields without the inducing of other decomposition reactions.

One embodiment of the invention relates to a conversion process which comprises isomerizing an isomerizable saturated hydrocarbon at a temperature in the range of from about 0° to about 525° C. and a pressure in the range of from about atmospheric to about 200 atmospheres in contact with a catalyst comprising a refractory inorganic oxide containing at least one metal from Group VIII of the Periodic Table chemically combined with a metal subfluoride vapor.

Other objects and embodiments referring to alternative isomerizable saturated hydrocarbons and to alternative catalytic compositions of matter will be found in the following further detailed description of the invention.

The process of my invention is especially applicable to the isomerization of isomerizable saturated hydrocarbons including acyclic paraffins and cyclic naphthenes, and is particularly suitable for the isomerization of straight chain and mildly branched-chain paraffins containing 4 or more carbon atoms per molecule, including normal butane, normal pentane, normal hexane, normal heptane, normal octane, etc. and mixtures thereof; or cycloparaffins ordinarily containing at least 5 carbon atoms in the ring such as alkylcyclopentanes, and cyclohexanes, including methylcyclopentane, dimethylcyclopentane, cyclohexane, methylcyclohexane, dimethylcyclohexane, etc. It is also applicable to the conversion of mixtures of paraffins and/or naphthenes such as those derived by selective fractionation and distillation of straight-run or natural gasolines and naphthas. Such mixtures of paraffins and/or naphthenes include so-called pentane fractions, normal hexane fractions, and mixtures thereof. It is not intended to limit this invention to those enumerated saturated hydrocarbons set out above as it is contemplated that straight or branched chain saturated hydrocarbons containing up to about 20 carbon atoms per molecule may be isomerized according to the process of the present invention.

As set forth hereinabove, the process of my invention is applicable to the isomerization of saturated hydrocarbons. Furthermore, these saturated hydrocarbons may be derived as selective fractions from various naturally occurring petroleum streams. For example, they may be separated as individual components or, as certain boiling range fractions by selective fractionation and distillation of catalytically cracked gas oil. Thus, the process of this invention may be successfully applied to and utilized for complete conversion of isomerizable saturated hydrocarbons when these isomerizable saturated hydrocarbons are present in minor quantities in various gas streams. Thus, the isomerizable saturated hydrocarbon for use in the process of this invention need not be concentrated. For example, isomerizable saturated hydrocarbons appear in minor quantities in various refinery gas streams, usually diluted with gases such as hydrogen, nitrogen, methane, ethane, propane, etc. These refinery streams containing minor quantities of isomerizable saturated hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery gas streams known as off-gas streams containing relatively minor quantities of said isomerizable saturated hydrocarbons.

As hereinbefore set forth, the invention is concerned with a conversion process for the isomerization of isomerizable saturated hydrocarbons, said process being effected in the presence of a catalyst which possesses a high degree of hydrocarbon conversion activity and is particularly effective as an isomerization catalyst for the isomerizable saturated hydrocarbons hereinabove set forth. The catalyst comprises a refractory inorganic oxide containing at least one metal from Group VIII of the Periodic Table chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides containing at least one metal from Group VIII of the Periodic Table such as silica, zirconia, magnesia, thoria, etc., and combinations of refractory oxides containing at least one metal from Group VIII of the Periodic Table such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide containing at least one metal from Group VIII of the Periodic Table that is combined with a metal subfluoride vapor to effect chemical combination of the refractory inorganic oxide with said metal subfluoride vapor.

Typical metals from Group VIII of the Periodic Table for use in the present invention include platinum, palladium, ruthenium, rhodium, osmium and iridium and mixtures thereof. Platinum and palladium are particularly preferred. The Group VIII component of my novel catalyst for use in the present invention will normally be utilized in an amount of from about 0.01 percent to about 2 percent by weight.

Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide containing at least one metal from Group VIII of the Periodic Table with the metal subfluoride vapor is accomplished as hereinafter described.

The catalyst of the present invention comprises a metal subfluoride vapor chemically combined with the refractory inorganic oxide containing at least one metal from Group VIII of the Periodic Table so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide containing at least one metal from Group VIII of the Periodic Table at temperatures in the range of 650° C. to about 1200° C. and at a pressure of from about subatmospheric to about 7 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide containing at least one metal from Group VIII of the Periodic Table which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide containing at least one metal from Group VIII of the Periodic Table catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the isomerizable saturated hydrocarbon is continuously charged to a reaction zone containing a fixed bed of the desired catalyst, said zone being maintained at the proper operating conditions of temperature and pressure, that is, a temperature in the range of from about 0° to about 525° C. or more, and preferably from 50° to about 475° C., and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as helium, hydrogen, nitrogen, argon, etc., may also be charged to the reaction zone if desired. Another continuous type operation comprises the moving bed type in which the isomerizable saturated hydrocarbon and the catalyst bed move either concurrently or countercurrently to each other while passing through said reaction zone.

Still another type of operation which may be used is the batch type operation in which a quantity of the isomerizable saturated hydrocarbon and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

A quartz vessel with provisions for connection to a vacuum system was filled with a mixture of about 50 grams of $\frac{1}{16}$ inch alumina spheres containing 0.75 percent (by weight) platinum and about 10 grams of $\frac{1}{8}$ inch pellets comprising about 20% aluminum metal and about 80% aluminum monofluoride by weight. The contents of the vessel are out-gassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.1 weight percent was achieved. This catalyst was designated as catalyst A.

EXAMPLE II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Aluminum monofluoride was then produced. A catalyst base in the form of $\frac{1}{16}$ inch alumina spheres containing 0.375 percent (by weight) platinum was then placed in the downstream helium flow and the aluminum monofluoride was chemically combined with the alumina base at a temperature in excess of 650° C.

The catalyst produced by this vapor deposition and chemical combination of the aluminum monofluoride with the alumina had a fluoride level of about 3.2 percent by weight of fluoride chemically combined therewith. This catalyst was designated as catalyst B.

EXAMPLE III

The catalyst designated as catalyst A prepared according to Example I above is utilized in an isomerization reaction, the finished catalyst being placed in an appropriate continuous isomerization apparatus. In the experiment, normal butane along with hydrogen is charged to the isomerization zone. The reactor is maintained at about 100 p.s.i.g. and 325° C. Substantial conversion of the normal butane to isobutane is obtained as is evidenced by gas-liquid chromatography.

EXAMPLE IV

A second portion of the catalyst prepared according to Example I and designated as catalyst A is again utilized in an appropriate continuous isomerization apparatus. In the experiment, a fresh batch of the finished catalyst is placed in the isomerization reaction zone and normal pentane along with hydrogen is charged to said reaction zone. The reactor is maintained at about 150 p.s.i.g. and about 355° C. Substantial conversion of the normal pentane to isopentane is obtained as is evidenced by gas-liquid chromatography.

EXAMPLE V

The catalyst prepared according to Example II and designated as catalyst B is utilized in an appropriate continuous isomerization apparatus to determine the isomerization activity of said catalyst. In the experiment, the catalyst is placed in the isomerization reaction zone and normal hexane and hydrogen are charged to said reaction zone. The reactor is maintained at about 150 p.s.i.g. and a temperature of about 380° C. Gas-liquid chromatographic analyses of the product stream indicate that substantial conversion occurs with the major products being 2,2-dimethylbutane, 2,3-dimethylbutane, 2-methylpentane and 3-methylpentane.

EXAMPLE VI

The catalyst prepared according to Example I and designated as catalyst A was utilized in the isomerization apparatus. In the experiment, a fresh batch of finished catalyst was placed in the isomerization reaction zone and methylcyclopentane and hydrogen are charged thereto. The reactor was maintained at about 150 p.s.i.g. and about 450° C. Substantial conversion of the methylcyclopentane was obtained as was evidenced by gas-liquid chromatography.

I claim as my invention:

1. The process of isomerizing an isomerizable saturated hydrocarbon at an isomerizing temperature of from about 0° to about 525° C. and a pressure of from about atmospheric to about 200 atmospheres in contact with a refractory inorganic oxide containing a metal from Group VIII of the Periodic Table and which has been chemically combined with a fluoride selected from the group consisting of aluminum monofluoride vapor and silicon difluoride vapor at a temperature of from about 650° to about 1200° C.

2. The process of claim 1 further characterized in that said fluoride is aluminum monofluoride.

3. The process of claim 2 further characterized in that said refractory inorganic oxide is alumina.

4. The process of claim 2 further characterized in that said refractory inorganic oxide is silica-alumina.

5. The process of claim 2 further characterized in that said Group VIII metal is platinum.

6. The process of claim 5 further characterized in that said isomerizable saturated hydrocarbon is an isomerizable acyclic paraffin hydrocarbon.

7. The process of claim 5 further characterized in that said isomerizable saturated hydrocarbon is an isomerizable cyclic paraffin hydrocarbon.

8. The process of claim 5 further characterized in that said isomerizable hydrocarbon is normal butane.

9. The process of claim 5 further characterized in that said isomerizable saturated hydrocarbon is normal pentane.

10. The process of claim 5 further characterized in that said isomerizable saturated hydrocarbon is methylcyclopentane.

References Cited

UNITED STATES PATENTS

| | | | |
|---|---|---|---|
| 2,322,622 | 6/1943 | Fischer | 260—683.2 |
| 2,924,629 | 2/1960 | Donaldson | 260—666 |
| 3,143,490 | 8/1964 | Brennan et al. | 260—683.2 |
| 3,175,014 | 3/1965 | Ballard et al. | 260—666 |
| 3,217,057 | 11/1965 | Moore et al. | 260—666 |
| 3,248,449 | 4/1966 | Goble | 260—683.2 |
| 3,345,428 | 10/1967 | McGrath | 260—683.2 |
| 2,471,647 | 5/1949 | Oblad | 260—683.2 |
| 2,483,131 | 9/1949 | Garrison | 260—683.2 |
| 2,568,964 | 9/1951 | Montgomery | 260—683.2 |
| 2,960,550 | 11/1960 | Feller | 260—683.2 |
| 2,733,219 | 1/1956 | Bloch | 260—683.75 |
| 2,900,425 | 8/1959 | Bloch et al. | 260—683.75 |
| 2,908,735 | 10/1959 | Haensel | 260—683.68 |
| 2,915,571 | 12/1959 | Haensel | 260—683.75 |
| 3,047,514 | 7/1962 | Burk | 260—683.75 |
| 3,047,646 | 7/1962 | Carr | 260—683.75 |
| 3,060,249 | 10/1962 | Wise | 260—683.75 |
| 3,085,123 | 4/1963 | Ridgway | 260—683.75 |
| 3,131,235 | 4/1964 | Asselin | 260—683.68 |

FOREIGN PATENTS

| | | |
|---|---|---|
| 966,785 | 8/1964 | Great Britain. |
| 899,378 | 6/1962 | Great Britain. |

DELBERT E. GANTZ, *Primary Examiner.*

V. O'KEEFE, *Assistant Examiner.*